United States Patent
Pascale et al.

(10) Patent No.: US 9,294,030 B2
(45) Date of Patent: Mar. 22, 2016

(54) METHOD OF PWM REGULATION OF A CONTINUOUS CURRENT ELECTRIC MOTOR

(71) Applicant: STMicroelectronics S.r.l., Agrate Brianza (IT)

(72) Inventors: Paolo Pascale, Rho (IT); Federico Magni, Settimo Milanese (IT); Ezio Galbiati, Agnadello Cremona (IT); Giuseppe Maiocchi, Capiago Intimiano (IT); Michele Berto Boscolo, Sesto San Giovanni (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 153 days.

(21) Appl. No.: 14/168,171

(22) Filed: Jan. 30, 2014

(65) Prior Publication Data

US 2014/0217949 A1    Aug. 7, 2014

(30) Foreign Application Priority Data

Feb. 6, 2013   (IT) .............................. M12013A0161

(51) Int. Cl.
  G05B 19/40  (2006.01)
  H02P 23/00  (2006.01)
  H02P 6/14   (2006.01)

(52) U.S. Cl.
  CPC ............. H02P 23/0036 (2013.01); H02P 6/14 (2013.01)

(58) Field of Classification Search
  CPC ................... G05B 11/28; G05B 2219/42237; H02P 7/29; H02P 6/085
  USPC ..................... 318/685, 696, 599, 811, 400.29
  See application file for complete search history.

(56) References Cited

U.S. PATENT DOCUMENTS

| 5,708,578 A | * | 1/1998 | Stoddard ................. H02P 6/142 363/95 |
| 6,119,046 A | * | 9/2000 | Sporer ............... H02M 7/53871 318/696 |
| 7,592,764 B2 | * | 9/2009 | Vermeir .................. H02P 6/002 318/372 |
| 2006/0255760 A1 | | 11/2006 | Yoshihisa |
| 2008/0284500 A1 | * | 11/2008 | Chigira ..................... H02P 8/22 327/538 |
| 2009/0206788 A1 | * | 8/2009 | Ando ......................... H02P 8/32 318/696 |
| 2010/0157635 A1 | * | 6/2010 | Bagarelli ............... H02M 3/157 363/123 |
| 2011/0057600 A1 | * | 3/2011 | Suda ......................... H02P 8/12 318/696 |

FOREIGN PATENT DOCUMENTS

| DE | 202305771 | 7/2003 |
| EP | 1139558 | 10/2001 |
| EP | 1503492 | 2/2005 |
| EP | 15023492 | 2/2005 |
| JP | 2006 129543 | 5/2006 |

* cited by examiner

*Primary Examiner* — Rina Duda
(74) *Attorney, Agent, or Firm* — Allen, Dyer, Doppelt, Milbrath & Gilchrist, P.A.

(57) ABSTRACT

A method of PWM regulating a motor through a half-bridge drive stage includes sampling the motor current to obtain sampled values during driving intervals or during current decay intervals, and comparing a last sampled value with a current threshold. The motor is coupled in a slow decay electrical path for the duration of a current decay interval if the last sampled value does not exceed the current threshold. Otherwise the motor is coupled in a fast decay electrical path for a portion of the duration of the current decay interval, and is coupled in the slow decay electrical path for a remaining part of the duration of the same current decay interval.

32 Claims, 5 Drawing Sheets

METHOD OF PWM REGULATION OF A CONTINUOUS CURRENT ELECTRIC MOTOR

FIELD OF THE INVENTION

This disclosure relates in general to the driving of electric motors, and more particularly, to a method of PWM regulation for a continuous current electric motor.

BACKGROUND

Figure 1:
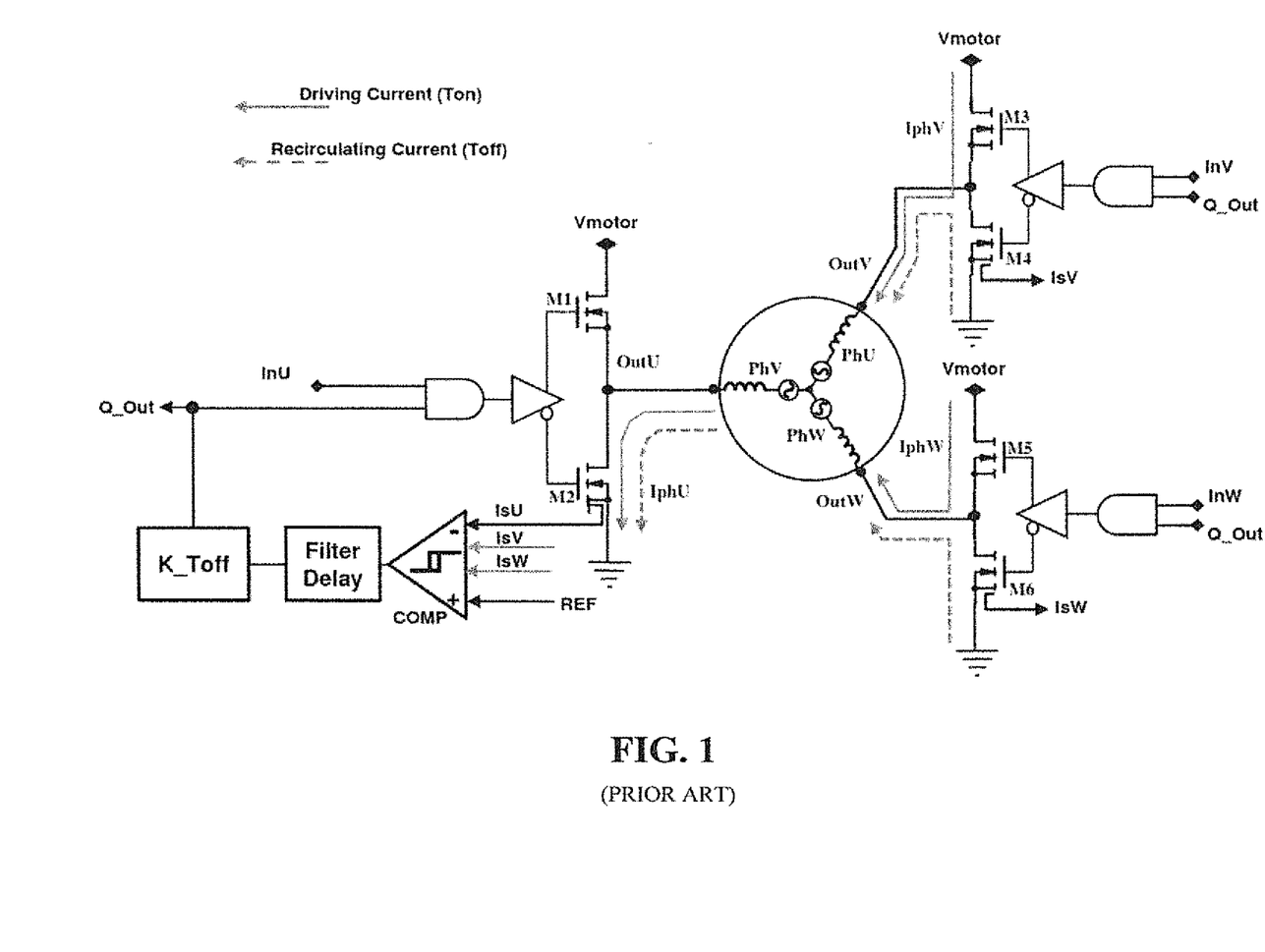
FIG. 1 is a block diagram of a current limitation system in a spindle motor using 3 low-side sense FETs in the power stage in a half-bridge configuration according to the prior art.

Current regulation flowing through windings of a continuous current electric motor may be carried out in a PWM mode by sensing the total current entering in or exiting from the motor. The motor may be, for example, a spindle motor for hard disk applications. A block diagram of a typical half-bridge drive stage of a spindle motor is depicted in FIG. 1. Each half-bridge comprises a low-side transistor referenced to ground and a high-side transistor connected to a supply voltage Vmotor.

Figure 2:
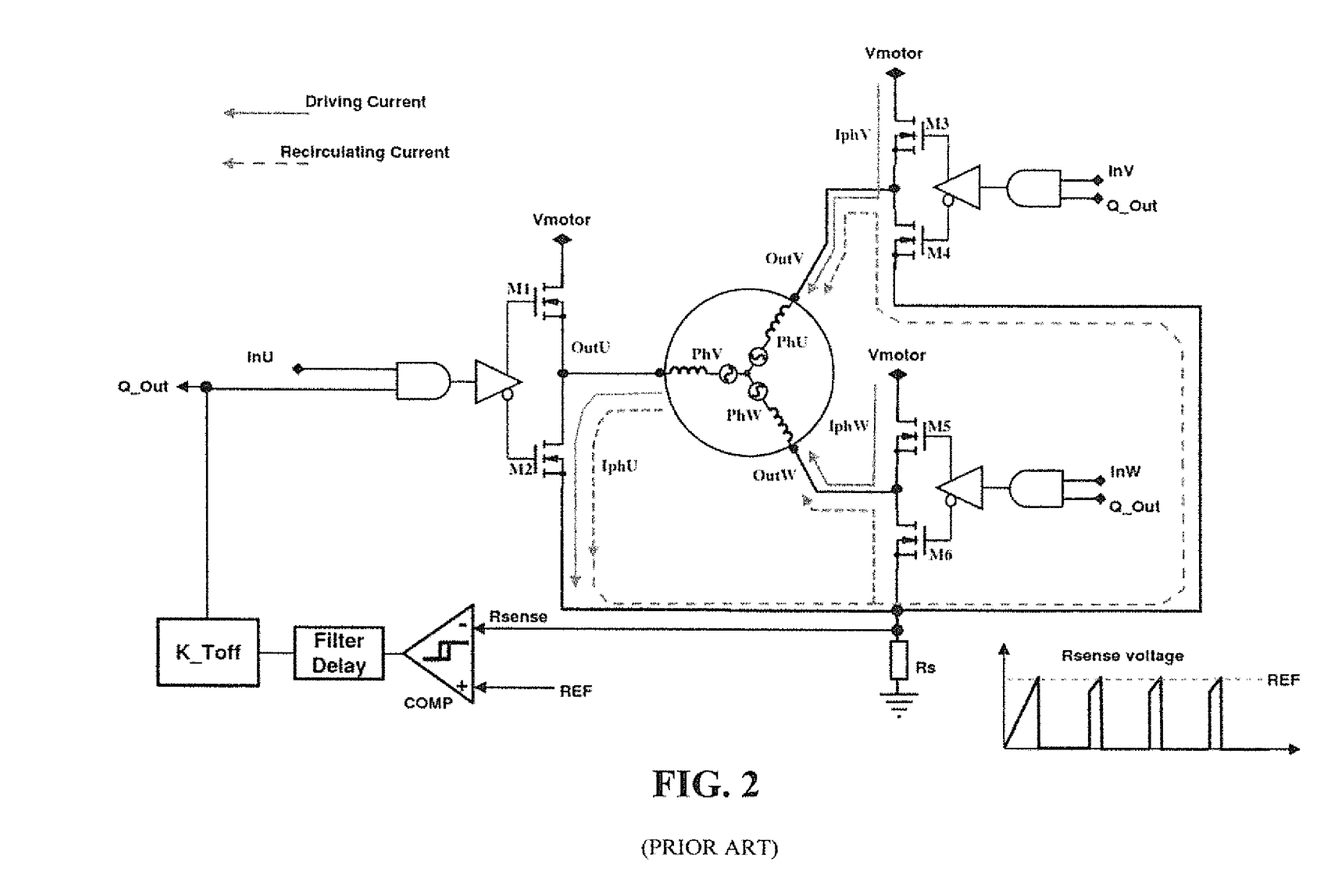
FIG. 2 is a block diagram of a current limitation system in a spindle motor using a sense resistance Rs connected between the common point of the source terminals of the power stage in a half-bridge configuration and ground (GND) according to the prior art.

Current sensing may be performed also through a sense resistor Rs, as shown in FIG. 2. The sense resistor Rs is connected between the common connection point of the source terminals of the low-side MOS and ground, as shown in the figure, or the line at the supply voltage Vmotor (not depicted). In this case, during the current decay interval, with the low-side MOS transistors M2, M4, M6 turned on, no current flows throughout the sense resistor Rs. This results in a loss of information about the intensity of the motor current. In other applications, a sense FET (not depicted) is used instead of the sense resistor Rs.

The overall current absorbed by the motor is compared with a reference REF. Each time the motor current surpasses this reference, the current limiter comparator (COMP) switches and the half-bridge drive stage is configured such that the motor current circulates in a current decay electrical path. This has a slow decay recirculation of the motor current for a constant and programmable time (K_Toff). For the whole duration of the constant decay interval K_Toff, the drive stage is configured with the three low-side MOS transistors on.

As an alternative, it is possible to obtain a slow decay recirculation of the current by turning on all 3 high-side MOS transistors M1, M3, M5. Typically, a digital filter may also be used (from 100 ns up to 0.5 μs, for example) for masking possible spurious switching of the comparator COMP that may give false information.

At the end of the current decay interval, the output stage is configured to energize again the motor windings (Ton). This allows the motor current to attain again the threshold REF, and the loop is repeated.

The described regulation loop is characterized by having a limited and non-instantaneous response time (minimum Ton). When the motor current attains the reference threshold, there is a response delay of the regulation loop before starting the slow recirculation phase, and thus making the current decrease below the regulation threshold REF.

Figure 3:
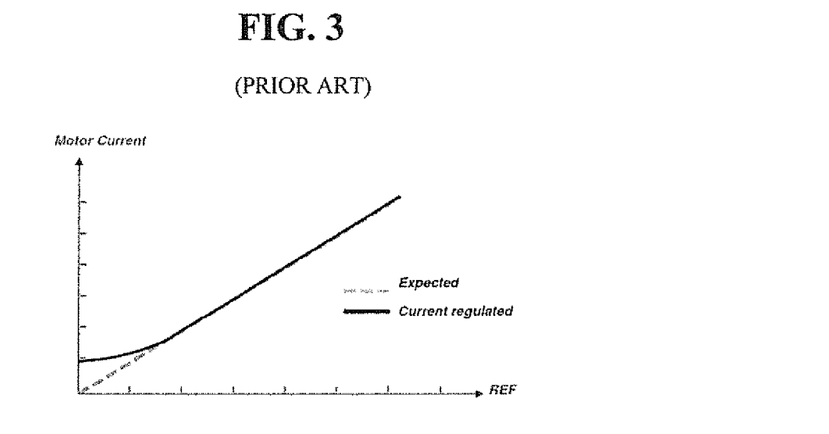
FIG. 3 is a comparison graph of the current behavior of the regulated current in the motor when the reference REF varies with the ideal behavior according to the prior art.

FIG. 3 depicts a graph of the regulated current that flows throughout the motor as a function of the regulation threshold REF. The continuous line represents a desired (or ideal) behavior, and the dashed line represents a current behavior.

For high currents the ideal and current behavior are practically the same. For small values of the regulation threshold REF, the problems tied to the loop delay (that makes driving intervals have at least a minimum duration Ton) do not allow the real current to track the desired value.

Figure 4:
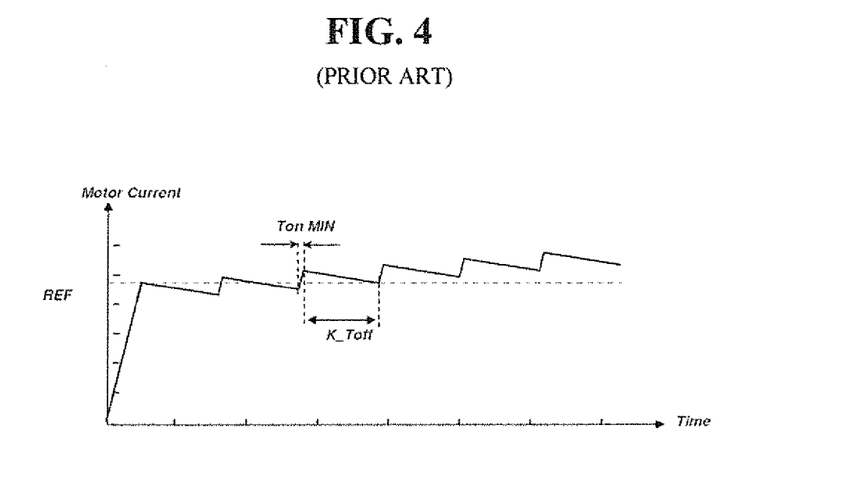
FIG. 4 illustrates the loss of the current regulation due to the minimum duration of the driving interval according to the prior art.

In particular applications, characterized for example by the use of a motor having a low phase impedance and supplied with a high voltage, the loop delay may cause a loss of current as depicted in FIG. 4. It may happen that, because of the minimum driving (energization) interval Ton due to the delay of the regulation loop, at each alternating cycle between driving (energization) intervals Ton and the slow decay intervals Toff of constant duration, the average value of the current increases progressively. Thus, the current flowing throughout the motor differs in an increasing manner from the desired regulation value REF.

Moreover, while driving a spindle motor, the phase of the back electromotive force that normally opposes the current flow may vary. It may vary such that during the decay interval there is an increase instead of a decrease of the current.

A regulation of the motor current to address or at least limit eventual regulation losses would be desirable. The eventual regulation losses may be due to the driving interval having a minimum duration, such as due to the characteristics of the control loop, for example.

SUMMARY

A method of PWM regulation of a continuous current electric motor using a half-bridge drive stage capable of effectively contrasting regulation losses is provided, even when the driving (energization) interval cannot be reduced as desired but has a minimum duration.

The method may comprise sampling the current absorbed by the motor, with the sampled values being obtained during the driving intervals (TON) or during the decay intervals (TOFF). The last sampled value may be compared with the current threshold (REF).

If the comparison does not exceed the current threshold (REF), then the motor is connected in a slow decay electrical path for the whole duration of a current decay interval (TOFF). Otherwise, the motor is connected in a fast decay electrical path for a portion of the duration or for the whole duration of a current decay interval (TOFF), and then connecting the motor in the slow decay electrical path for the remaining portion of the duration of the same current decay interval (TOFF).

The method may be implemented through software executed by a microcontroller for regulation systems of continuous current motors. More particularly, a computer-readable medium having computer-executable instructions for causing a microcontroller of a drive system of an electric motor to perform steps includes sampling motor current to obtain sampled values during driving intervals or during current decay intervals, and comparing a last sampled value with a current threshold. Then the steps may comprise coupling the motor in a slow decay electrical path for the duration of a current decay interval if the last sampled value does not exceed the current threshold, otherwise coupling the motor in a fast decay electrical path for a portion of the duration of the current decay interval, and coupling the motor in the slow decay electrical path for a remaining part of the duration of the same current decay interval.

DETAILED DESCRIPTION OF THE EMBODIMENTS

In the method of PWM regulation of a continuous current electric motor according to the present disclosure, the current decay mode of the motor is fixed depending on the result of the current sampling in pre-established instants. The current decay may be slow, fast, and combined, before slow and then fast. The current decay may be adjusted depending on the functioning conditions and of the used current sensing element.

According to the method of this disclosure, the regulation loop senses the current level in a zone of the current decay interval. Reference will be made to the case in which the electric motor is a three-phase spindle motor for hard-disks, but other types of electric motors are applicable. For sake of ease and only as a non-limiting example, the case in which the motor current is sensed at the middle of the decay interval K_Toff is considered.

The low-side sense MOSFET is a current sense element, as shown in FIG. 1, for example, during the driving interval wherein the high side MOSFETs of the phases V and W and the low-side MOSFET of the phase U are on. During the slow decay interval, all the low-side MOSFETs of the phases U-V-W are on. The motor current is sensed by the low side sense MOSFET of the phase U both during the active phase as well as during the slow decay phase, with the MOSFET of the phase U being always on.

Figure 5:
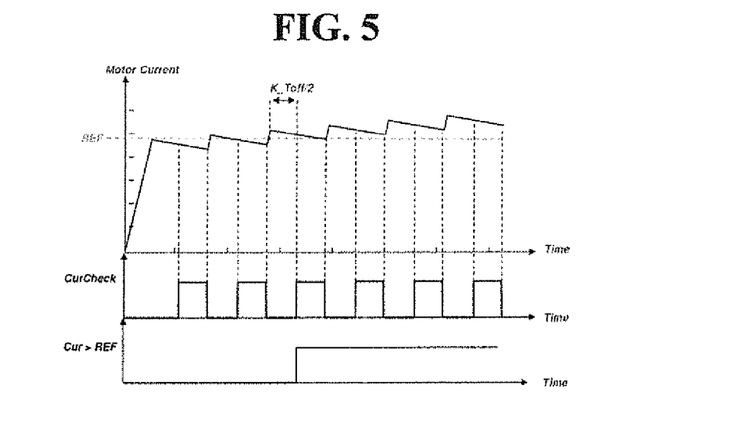
FIG. 5 depicts the graph of FIG. 4 and a train of sampling pulses CurCheck for implementing an embodiment according to the present disclosure, with the low-side sense FETs used as current sensors.

In FIG. 5, which makes reference to the regulation loop of FIG. 1 along with the graph of the controlled motor current, include graphs of a train of sampling pulses CurCheck and of a logic signal Cur>REF that indicates when the sampled current during the decay interval exceeds the reference current REF.

In synchronization with the train of pulses CurCheck a check is made whether the current absorbed by the motor has decayed below the reference current REF. In the considered example, the signal CurCheck assumes a high logic value from half of the decay interval (K_Toff/2) until the end thereof (K_Toff).

In general, if the current is sampled during the decay phase, the signal CurCheck will assume a high logic value in an initial, final or intermediate portion of the decay interval, and will assume a low logic level in the remaining portion of the decay interval.

The signal Cur>REF indicates whether the sensed current, at the instant CurCheck=1, is below the reference REF or not. This information may be used on the current level for monitoring the driving of the motor and for preventing the loss of current regulation.

Referring to the regulation loop of FIG. 1, the regulation of the current drawn by the continuous current electric motor is carried out as follows. During the active phase (Ton) the output stage is driven to force the motor currents in the desired direction. For example, the current is entering through the phases V and W and is exiting from the phase U. As soon as the motor current attains a limitation threshold REF, set by users based on the considered application, the slow decay phase is enabled by turning on the low-sides of the 3 phases and a current decay interval K_Toff is started. The duration of the current decay interval K_Toff is typically set by a counter of clock pulses that flags the end of the interval when a certain pre-established number of pulses has been counted.

When this counter of the duration of the current decay interval K_Toff has counted one half of the pre-established number of clock pulses (instant K_Toff/2), the level of the motor current is sampled again using the signal CurCheck.

If the motor current is below the reference threshold REF (Cur>REF=0), the regulation loop remains in the same conditions with the low-side of the phases U-V-W on, till the end of the current decay interval K_Toff. In this case, the whole current decay interval is carried out by connecting the motor in a slow decay path (all the low-side MOSFETs are on), and returning again in the active energization (driving) interval of the phases U-V-W. This is with the current entering through the phases V and W and exiting from the phase U.

In the case in which, from the instant K_Toff/2, the current is still above the reference current (Cur>REF=1), the regulation loop is configured to force a fast decay of the motor current for the remaining part of the current decay interval.

With this technique, the current decay is carried out in a mixed mode (in this example, half slow and half fast) such that, at the end of the current decay interval, the current will be reduced so that the next driving interval will last longer than the minimum duration TONmin set by the propagation characteristics of the regulation loop. This avoids a loss of control of the current.

The fast decay of the current may be carried out, for example, by turning off all the MOS transistors of the output stage. In this case, the motor current that enters through the phases V and W and exits from the phase U will be discharged through the intrinsic diodes of the low side MOS transistors of the phases V, W and in the intrinsic diode of the high-side switch of the phase U. Given that these intrinsic diodes have a greater resistance than corresponding MOS transistors when they are turned on, the current decay will be faster.

As an alternative, it is possible to invert the configuration of the half-bridges with respect to the driving interval to energize the motor in an inverse manner. For example, if during the driving interval the current enters in the windings V and W and exits from the winding U (briefly: V-W-!U), as shown by way of example in FIGS. 1 and 2, then during the fast decay interval the motor is connected in an electrical path of inverse energization !V-!W-U. That is, the current exits from the windings V and W and enters through the winding U.

Figure 6A:
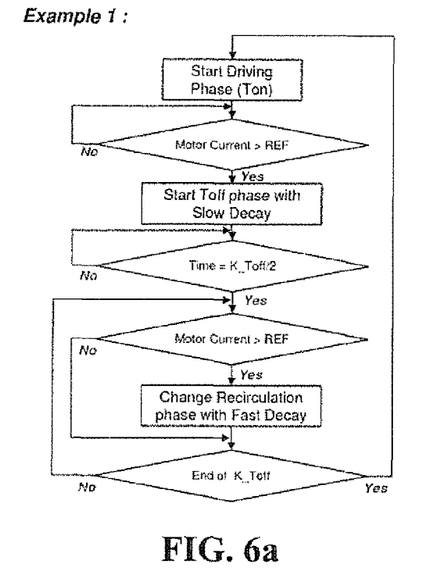
FIGS. 6a and 6b are two exemplary flow charts of embodiments of the method of the present disclosure.
Figure 7:
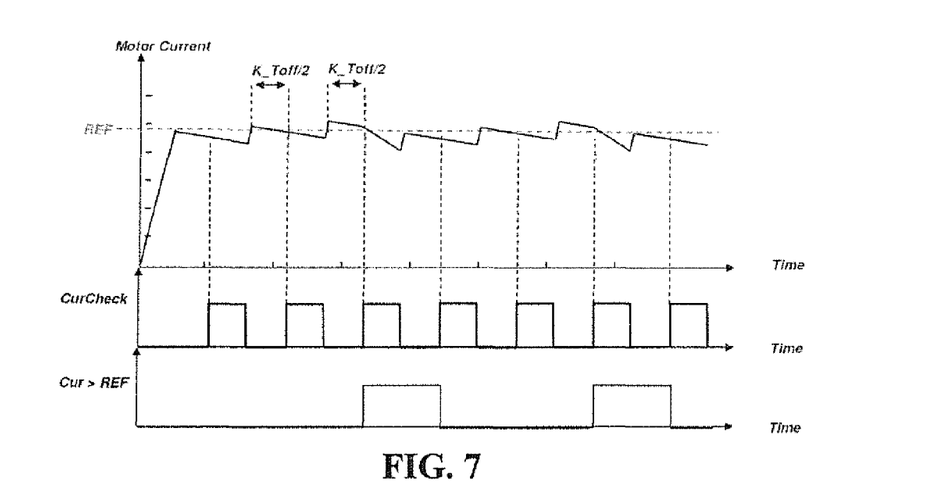
FIG. 7 is a graph of the motor current for the method of the present disclosure using low-side sense FETs as current sensors.

The graph of FIG. 7 illustrates an exemplary time graph of the motor current that is obtained with the just described method. If at the instant K_Toff/2 the current is sensed below the current limitation threshold REF, the regulation loop keeps its configuration and carries out a slow decay until the end of the current decay interval. In the case, in which at the instant K_Toff/2 the sensed current is above the current limitation threshold REF, the regulation loop changes the configuration of the switches of the half-bridges to connect the motor in a fast decay electrical path. This reduces faster the motor current. FIG. 6a depicts the flow chart corresponding to the just described regulation method.

Figure 6B:
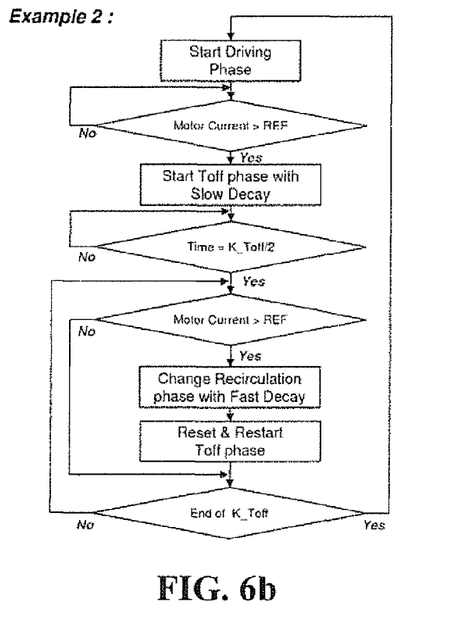

FIG. 6b illustrates another embodiment of the regulation method, alternative to the previous one, in which if at the instant K_Toff/2 the sensed current is above the current limitation level REF, then instead of carrying out a fast decay only for the final portion of the current decay interval, a current decay interval is started from the beginning in a fast decay mode. In this way, there will be an increased reduction of the motor current. The next driving interval will require a longer time than the time TONmin for attaining again the current limitation threshold REF.

Another exemplary embodiment of the method of regulation that may be used with the regulation loop of FIG. 2 will now be described, wherein the half-bridges are referenced to ground through a sense resistance Rs. The same observations hold also in the case in which the half-bridges are referenced to the line at the supply voltage Vmotor and/or a sense FET is used instead of the sense resistance Rs.

With the regulation loop of FIG. 2, the method described referring to FIGS. 6a and 6b would be hardly implementable because when the low-side switches M2, M4, M6 are turned on for carrying out the slow decay, no current is flowing throughout the sense resistance Rs.

To obviate this limitation, the step of sensing of the absorbed current that determines the eventual change of configuration of the half-bridges for switching from a slow decay mode to a fast decay mode, is carried out at the beginning of the driving interval of the motor windings (Ton). This is illustrated in the flow-charts of FIGS. 8a and 8b.

Figure 8A:
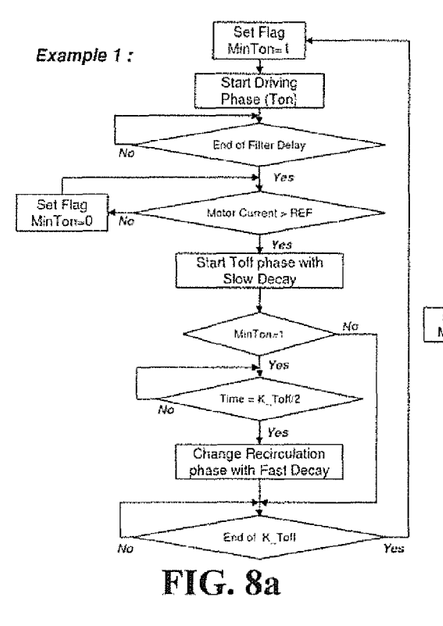
FIGS. 8a and 8b are two exemplary flow charts of other embodiments of the method according to the present disclosure using a sense resistance Rs as a current sensor.
Figure 8B:
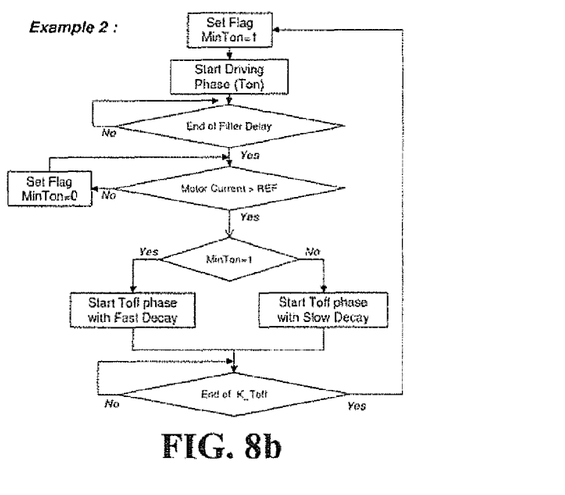

At the beginning of each new driving (energization) interval, the comparison signal generated by the current limitation comparator COMP is filtered, preferably through a digital filter, for preventing spurious switching. The current absorbed by the motor may be sensed immediately after the beginning of the driving interval, at the end of a time equal to that required by the digital filter for generating a stable filtered replica signal of the comparison signal.

If during the driving interval, after the time required by the digital filter for generating a stable signal without spurious switching has elapsed, the level of the motor current is below the regulation threshold REF, the signal Cur>REF will be set to 0. When the current attains the regulation threshold, the decay interval will be started, for example, by connecting the motor in a slow decay electrical path.

If the level of the current absorbed by the motor is already above the regulation threshold REF, the signal Cur>REF will be set to 1 and at the same time a slow decay will be started for an initial portion of the current decay interval (for example, of a duration equal to K_Toff/2) for switching the half-bridges to perform a fast decay for the remaining portion of the decay interval.

Figure 9:
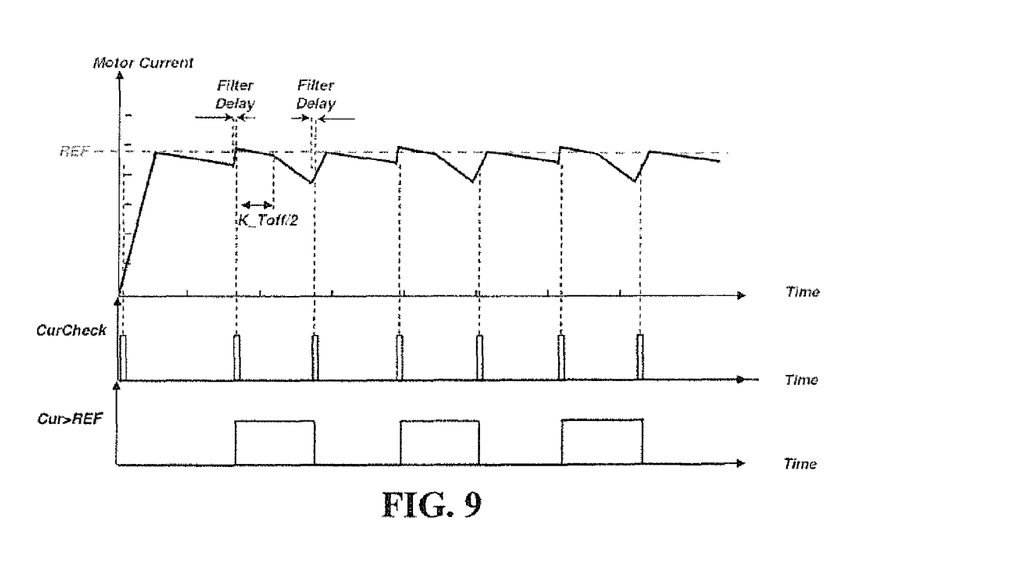
FIG. 9 is an exemplary graph of the current flowing throughout the motor obtained with the method of the present disclosure using a sense resistance $R_S$ as a current sensor.

FIG. 8a depicts the flow-chart of the just described method of regulation. The time graph of FIG. 9 sketches the motor current waveform obtained with this method.

FIG. 8b depicts the flow-chart of an alternative embodiment of the method of regulation, usable with the regulation loop of FIG. 2. If when the current absorbed by the motor is sampled, after the beginning of the driving interval, the absorbed current may already be above the regulation threshold REF. Instead of carrying out a slow decay during an initial portion of the current decay interval, followed by a fast decay during the final portion of the current decay interval, a whole current decay interval may be carried out by configuring the half-bridges to connect the motor in a fast decay electrical path. Even in this case, the fast decay may be carried out by turning off all MOS transistors of the half-bridges of the driving stage or by configuring them such to connect the motor in an inverse energization electrical path.

The invention claimed is:

1. A method of PWM regulating a motor through a half-bridge drive stage configured to couple the motor in a direct electrical path during driving intervals, or in a current decay electrical path selected between a slow decay electrical path and a fast decay electrical path during current decay intervals, the half-bridge drive stage comprising a plurality of half-bridges, each half-bridge comprising a high-side switch coupled to a supply voltage and a low-side switch coupled to a reference voltage, the method comprising:
    sampling the motor current to obtain sampled values during the driving intervals or during the current decay intervals; and
    comparing a last sampled value with a current threshold, then
        coupling the motor in the slow decay electrical path for the duration of a current decay interval if the last sampled value does not exceed the current threshold, the coupling comprising turning on all of the low-side switches of the half-bridges, otherwise
        coupling the motor in the fast decay electrical path for a portion of the duration of the current decay interval, and coupling the motor in the slow decay electrical path for a remaining part of the duration of the same current decay interval.

2. The method according to claim 1, wherein the driving intervals have at least a minimum duration, and the current decay intervals have a constant and programmable duration and are activated when the current absorbed by the motor exceeds a threshold current.

3. The method according to claim 1, wherein coupling the motor in the fast decay electrical path further comprises:
    turning off all of the low-side and high-side switches of the plurality of half-bridges or configuring the low-side and high-side switches to define an inverse electrical path.

4. The method according to claim 1, wherein each half-bridge is coupled to the reference voltage and to the supply voltage through direct connection, and wherein sampling the motor current is performed during the current decay intervals.

5. The method according to claim 3, wherein each half-bridge is coupled to the reference voltage and to the supply voltage through sense resistive components, and wherein sampling the motor current is performed during the driving intervals.

6. The method according to claim 5, further comprising coupling the motor in the slow decay electrical path during an initial portion of the current decay interval, and if the last sampled value exceeds the current threshold, coupling the motor in the fast decay electrical path during the final portion of the current decay interval.

7. The method according to claim 1, further comprising coupling the motor in the fast decay electrical path for the whole duration of the interval of the current decay if the last sampled value exceeds the current threshold.

8. The method according to claim 1, further comprising coupling the motor in the slow decay electrical path during an initial portion of the current decay interval, and if the last sampled value exceeds the current threshold then coupling the motor in the fast decay electric path and starting from the beginning a new current decay interval.

9. The method according to claim 1, wherein the sampling is carried out by at least:
generating a train of sampling pulses;
sampling the motor current based on active edges of the train of sampling pulses; and
determining whether the last sampled value exceeds the current threshold by at least
generating a representative signal of the motor current,
operating a hysteresis comparator to compare the representative signal with the current threshold, and generate a corresponding comparison signal, and
filtering spurious switching of the comparison signal, generating a filtered replica signal having a logic level corresponding to a result of the comparison.

10. A method of regulating a motor through a plurality of half-bridges, each half-bridge comprising a high-side switch coupled to a supply voltage and a low-side switch coupled to a reference voltage, the method comprising:
sampling motor current to obtain sampled values during driving intervals or during current decay intervals; and
comparing a last sampled value with a current threshold, then
coupling the motor in a slow decay electrical path for the duration of a current decay interval if the last sampled value does not exceed the current threshold, the coupling comprising turning on all of the low-side switches, otherwise
coupling the motor in a fast decay electrical path for a portion of the duration of the current decay interval, and coupling the motor in the slow decay electrical path for a remaining part of the duration of the same current decay interval.

11. The method according to claim 10, wherein the driving intervals have at least a minimum duration, and the current decay intervals have a constant and programmable duration and are activated when the current absorbed by the motor exceeds a threshold current.

12. The method according to claim 10, wherein coupling the motor in the fast decay electrical path comprises:
turning off all of low-side and high-side switches or configuring the plurality of low-side and high-side switches to define an inverse electrical path.

13. The method according to claim 12, wherein the plurality of low-side switches are coupled to the reference voltage and the plurality of high-side switches are coupled to the supply voltage through a direct connection, and wherein sampling the motor current is performed during the current decay intervals.

14. The method according to claim 12, wherein the plurality of low-side switches are coupled to the reference voltage and the plurality of high-side switches are coupled to the supply voltage through a sense resistive component, and wherein sampling the motor current is performed during the driving intervals.

15. The method according to claim 14, further comprising coupling the motor in the slow decay electrical path during an initial portion of the current decay interval, and if the last sampled value exceeds the current threshold, coupling the motor in the fast decay electrical path during the final portion of the current decay interval.

16. The method according to claim 10, further comprising coupling the motor in the fast decay electrical path for the whole duration of the interval of the current decay if the last sampled value exceeds the current threshold.

17. The method according to claim 10, wherein the sampling is carried out by at least:
generating a train of sampling pulses;
sampling the motor current based on active edges of the train of sampling pulses; and
determining whether the last sampled value exceeds the current threshold through the following steps
generating a representative signal of the motor current,
operating a hysteresis comparator to compare the representative signal with the current threshold, and generate a corresponding comparison signal, and
filtering spurious switching of the comparison signal, generating a filtered replica signal having a logic level corresponding to a result of the comparison.

18. A control circuit for a motor that is regulated through a plurality of half-bridges, each half-bridge comprising a high-side switch coupled to a supply voltage and a low-side switch coupled to a reference voltage, the control circuit comprising:
a sampling circuit configured to sample motor current to obtain sampled values during driving intervals or during current decay intervals; and
a comparing circuit configured to compare a last sampled value with a current threshold, and configured to
couple the motor in a slow decay electrical path for the duration of a current decay interval if the last sampled value does not exceed the current threshold, the coupling comprising turning on all of the low-side switches, otherwise
couple the motor in a fast decay electrical path for a portion of the duration of the current decay interval, and couple the motor in the slow decay electrical path for a remaining part of the duration of the same current decay interval.

19. The control circuit according to claim 18, wherein the driving intervals have at least a minimum duration, and the current decay intervals have a constant and programmable duration and are activated when the current absorbed by the motor exceeds a threshold current.

20. The control circuit according to claim 18, wherein said comparing circuit is configured so that coupling the motor in the fast decay electrical path comprises:
turning off all of the low-side and high-side switches or configuring the plurality of low-side and high-side switches to define an inverse electrical path.

21. The control circuit according to claim 20, wherein the plurality of low-side switches are coupled to the reference voltage and the plurality of high-side switches are coupled to the supply voltage through a direct connection, and wherein sampling the motor current is performed during the current decay intervals.

22. The control circuit according to claim 20, wherein the plurality of low-side switches are coupled to the reference voltage and the plurality of high-side switches are coupled to the supply voltage through a sense resistive component, and wherein sampling the motor current is performed during the driving intervals.

23. The control circuit according to claim 22, wherein said comparing circuit is configured to couple the motor in the slow decay electrical path during an initial portion of the current decay interval, and if the last sampled value exceeds the current threshold, couple the motor in the fast decay electrical path during the final portion of the current decay interval.

24. The control circuit according to claim 18, wherein said comparing circuit is configured to couple the motor in the fast decay electrical path for the whole duration of the interval of the current decay if the last sampled value exceeds the current threshold.

25. A non-transitory computer-readable medium having computer-executable instructions for causing a microcontroller to regulate a motor through a plurality of half-bridges, each half-bridge comprising a high-side switch coupled to a supply voltage and a low-side switch coupled to a reference voltage, the regulating comprising:
   sampling motor current to obtain sampled values during driving intervals or during current decay intervals; and
   comparing a last sampled value with a current threshold, then
   coupling the motor in a slow decay electrical path for the duration of a current decay interval if the last sampled value does not exceed the current threshold, the coupling comprising turning on all of the low-side switches, otherwise
   coupling the motor in a fast decay electrical path for a portion of the duration of the current decay interval, and coupling the motor in the slow decay electrical path for a remaining part of the duration of the same current decay interval.

26. The non-transitory computer-readable medium according to claim 25, wherein the driving intervals have at least a minimum duration, and the current decay intervals have a constant and programmable duration and are activated when the current absorbed by the motor exceeds a threshold current.

27. The non-transitory computer-readable medium according to claim 25, wherein coupling the motor in the fast decay electrical path comprises:
   turning off all of low-side and high-side switches of the half-bridges or configuring the plurality of low-side and high-side switches to define an inverse electrical path.

28. The non-transitory computer-readable medium according to claim 27, wherein each half-bridge is coupled to the supply voltage and to the reference voltage through a direct connection, and wherein sampling the motor current is performed during the current decay intervals.

29. The non-transitory computer-readable medium according to claim 27, wherein each half-bridge is coupled to the supply voltage and to the reference voltage through a sense resistive component, and wherein sampling the motor current is performed during the driving intervals.

30. The non-transitory computer-readable medium according to claim 29, further comprising coupling the motor in the slow decay electrical path during an initial portion of the current decay interval, and if the last sampled value exceeds the current threshold, coupling the motor in the fast decay electrical path during the final portion of the current decay interval.

31. The non-transitory computer-readable medium according to claim 25, further comprising coupling the motor in the fast decay electrical path for the whole duration of the interval of the current decay if the last sampled value exceeds the current threshold.

32. The non-transitory computer-readable medium according to claim 25, further comprising coupling the motor in the slow decay electrical path during an initial portion of the current decay interval, and if the last sampled value exceeds the current threshold then coupling the motor in the fast decay electric path and starting from the beginning a new current decay interval.

* * * * *

UNITED STATES PATENT AND TRADEMARK OFFICE
CERTIFICATE OF CORRECTION

PATENT NO. : 9,294,030 B2  
APPLICATION NO. : 14/168171  
DATED : March 22, 2016  
INVENTOR(S) : Pascale et al.

Page 1 of 1

It is certified that error appears in the above-identified patent and that said Letters Patent is hereby corrected as shown below:

On the Title Page, Item 72     Delete: "Michele Berto Boscolo"  
    Insert --Michele Boscolo Berto--

Signed and Sealed this  
Thirty-first Day of May, 2016

Michelle K. Lee  
*Director of the United States Patent and Trademark Office*